Feb. 24, 1970
C. R. MOORE
3,497,791
TRANSISTORIZED BATTERY CHARGER
Filed Aug. 15, 1967
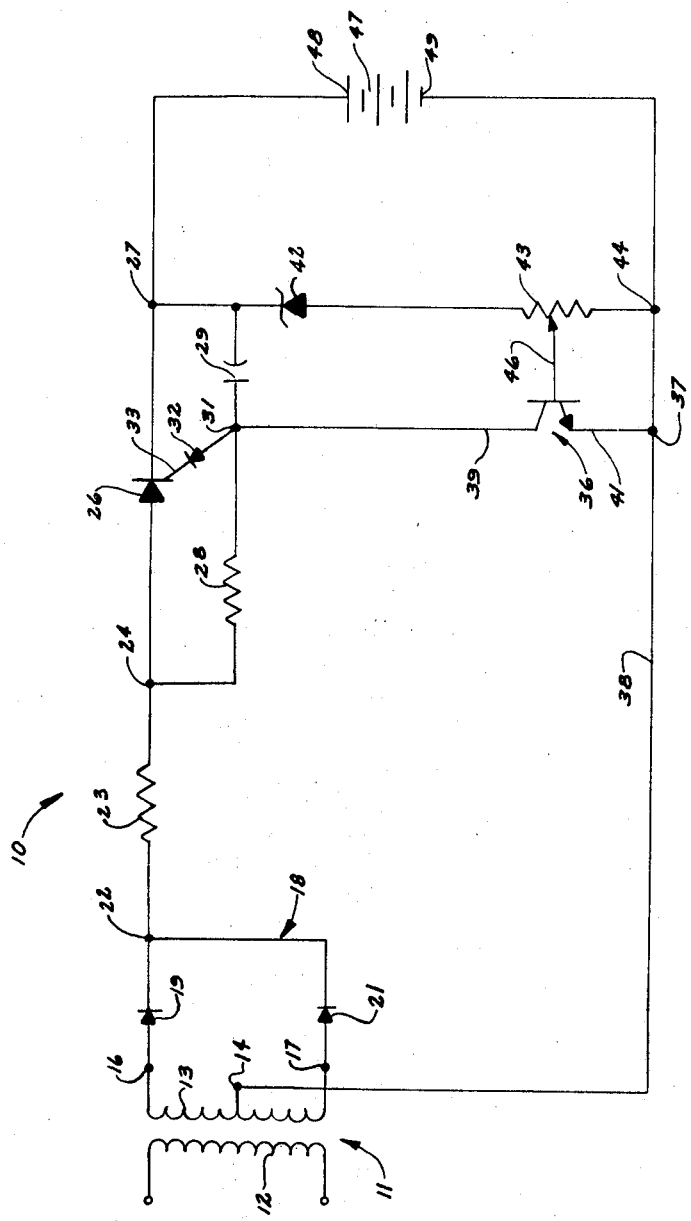
INVENTOR.
CHARLES R. MOORE
BY
Woodhams, Blanchard & Flynn
ATTORNEYS United States Patent Office 3,497,791
Patented Feb. 24, 1970

3,497,791
TRANSISTORIZED BATTERY CHARGER
Charles R. Moore, 1615 N. Merrifield St.,
Mishawaka, Ind. 46544
Filed Aug. 15, 1967, Ser. No. 660,654
Int. Cl. H02j 7/10
U.S. Cl. 320—39                                                    1 Claim

ABSTRACT OF THE DISCLOSURE

A charger for a storage battery having a transformer with its primary winding connected to a source of alternating potential and a secondary winding connected through a current limiting resistor and an SCR to the storage battery. A voltage sensor is connected in parallel with the storage battery and controls a transistor connected to the gate of the SCR. The battery voltage acts through the transistor to control the SCR resulting in control of the charging operation.

FIELD OF THE INVENTION

This invention relates to circuitry for an automatic battery charger, and more particularly, relates to such a circuit characterized by extremely simple and inexpensive means for energizing and de-energizing the battery charging functions.

DESCRIPTION OF THE PRIOR ART

The usefulness of automatic storage battery chargers operating from a source of alternating potential has been well known for a long time in a number of applications, among which one of major importance is the use of such chargers in automotive service stations. In such places, it is desirable to connect a battery needing charging to the charging equipment, permit it to charge to a desired level and then automatically terminate the charging. This, for obvious reasons, makes unnecessary a constant supervision of the charging operation by an attendant. If the charging voltage is applied to the storage battery for a long period of time without regulation as to the amplitude, then the chemical change within the battery which is normally brought out by charging is carried too far and the battery may be damaged. This is fully recognized by the prior art and, among other places, is adequately described in a publication entitled, "The Battery Side of Voltage Regulation," published by the Delco-Remy Division of General Motors Corporation and bearing date of May 21, 1952, and in "Battery Service Manual," published by the Association of American Battery Manufacturers, 1953.

In other uses of storage batteries, it is sometimes desirable to have a storage battery as an immediate source of steady D.C. potential but to have a charging device continually connected thereto which will commence charging when the potential of the battery falls below a predetermined amount and will cease charging automatically when the potential rises to a predetermined amount.

In either case, it is desirable to have charging devices which will automatically turn themselves on and off within a high degree of accuracy with respect to the voltage levels desired but which are relatively inexpensive to manufacture and which will be inexpensive to maintain in accurate and efficient operating condition. Particularly in this latter connection, it is desirable to have circuitry capable of being built from solid-state components so as to enable it to accept shock and/or vibration, such as may occur by rough usage in an automotive service station, without suffering appreciable damage and particularly without destroying the accuracy and efficiency of the apparatus.

To accomplish this regulation, it has in the past been common in one form of battery charging equipment to apply an ammeter to the output of a battery charger in order to measure the battery condition and then to regulate the charging conditions by suitable adjustments within the charging unit so that the charger output would be brought and held within known and proper limits. This equipment is attractively inexpensive and works well enough when carried out by skilled and conscientious workmen. However, when the workman is unskilled or is inattentive, it is not as accurate as desired and may, in any event, be time consuming.

In other forms of battery charging equipment, automatic regulation has been provided but the equipment thus far developed for this purpose has been complex and expensive. Particularly, many battery chargers in the prior art have utilized transistorized circuits, and in many of these circuits the heart thereof is a silicon controlled rectifier known in the trade as the SCR. In a typical transistorized battery charger, the circuit can be separated into three different components which are as follows: (1) the power source; (2) the switching or current control (SCR); and (3) the control circuit. Of these, the control circuit can be further broken down into basically three subcircuits. They are: (1) the reference source; (2) the sensing source; and (3) the differential amplifier. The operation of the control circuit is based on a reference voltage for current of an established and constant value from the reference source. The sensing source senses the battery charge utilizing the D.C. voltage level of the battery. The information from the sensing source and the reference source is compared in the differential amplifier circuit to determine a control voltage for the SCR. If the difference is sufficient between the sensing and reference sources, the differential amplifier will apply a sufficient control to the SCR to cause it to turn on and charge the battery. When the difference becomes slight, the SCR will turn off.

Thus while these circuits are effective, they are complex and expensive to manufacture. Furthermore, consideration must be given in some of these circuits to the use of temperature compensated devices in various critical areas which adds further complexity and expense.

Therefore, in a constant effort to improve apparatus of this general type, it is desired to provide means by which automatic regulation can be obtained more easily and inexpensively than is possible with equipment of the prior art, whereby to affect the application of such regulation in a larger number of cases than is now done where the operator uses prior art equipment.

Accordingly, the objects of this invention include:

(1) To provide a circuit for an automatic battery charger, which is extremely simple and can be made entirely from solid-state components.

(2) To further provide a circuit for an automatic battery charger, as aforesaid, which will be inexpensive to manufacture and which will be equally inexpensive to maintain in accurate and efficient operating condition.

(3) To further provide a circuit for an automatic battery charger, as aforesaid, which can be made with extreme ruggedness and can, accordingly, withstand rough usage, particularly, either or both of shocks and vibrations, without impairing either its efficiency of operation or its accuracy in responding to starting and stopping signals.

(4) To further provide a circuit for an automatic battery charger, as aforesaid, which will provide a charging device having very few adjustments to make and wherein those adjustments which must be made can be made with extreme ease by ordinary operating personnel.

Other objects and purposes of this invention will be apparent to persons acquainted with apparatus of this general type upon reading the following specification and inspecting the accompanying drawing.

BRIEF DESCRIPTION OF THE DRAWING

The drawing illustrates a transistorized battery charging circuit embodying the invention.

Certain terminology will be used in the following description for convenience in reference only and will not be limiting. The words "rightwardly" and "leftwardly" will designate directions in the drawing to which reference is made. Said terminology will include the words above specifically mentioned, derivatives thereof and words of similar import.

SUMMARY OF THE INVENTION

In general, the objects and the purposes of the invention are met by providing a battery charging circuit for charging a storage battery having a transformer with its primary winding connectible to a source of alternating potential and its secondary winding connectible through a rectifier to first and second terminals. Current-limiting means are connected to the first of said terminals and said means have connected in series therewith valving means controllable directly by the voltage appearing on the storage battery for regulating the charging current to said storage battery. In its usual arrangement, the valving means is initially conductive for a charging operation and is then activated by a predetermined level of voltage across the storage battery to render the valving means nonconductive and thereby stop the charging operation.

DETAILED DESCRIPTION

A battery charging circuit 10 embodying the invention is illustrated in the drawing. A power transformer 11 has its primary winding 12 connected to any source of alternating potential, preferably 110 volts or 220 volts. The secondary winding 13 thereof has a center-tap 14 and a pair of end-taps 16 and 17. A rectifier circuit 18 is connected between the end-taps 16 and 17 and comprises a diode 19 having its anode connected to the end-tap 16 and a diode 21 having its anode connected to the end-tap 17. The cathodes of the diodes 19 and 21 are connected to a common junction point 22, which is the output terminal for the rectifier. One end of a current-limiting resistor 23 is connected to the junction point 22 and the other end thereof is connected to a junction point 24.

One end of a silicon controlled rectifier 26 (commonly referred to in the field and hereinafter as an SCR) is connected by its anode to the junction point 24 and by its cathode to a junction point 27. A series connected resistor 28 and capacitor 29 are connected in parallel with the SCR 26 between the junction points 24 and 27. A junction point 31 is located between the resistor 28 and the capacitor 29 and is connected through a diode 32 to the "gate" control electrode 33 of the SCR 26.

A transistor 36 is connected between the junction point 31 and a junction point 37 located on the conductor 38 which is connected to the center-tap 14 of the secondary winding 13 of the power transformer 11. More particularly, and in this embodiment, an NPN transistor is utilized wherein the collector 39 is connected to the junction point 31 and the emitter 41 thereof is connected to the junction point 37. It is recognized, of course, that a PNP transistor can be utilized with appropriate changes in the circuitry which will be discussed hereinbelow.

The cathode of Zener diode 42 is connected to the junction point 27 and the anode thereof is connected through a potentiometer 43 to a junction point 44. The center-tap 46 of the potentiometer 43 is connected to the base electrode of the transistor 36. In the case mentioned hereinabove wherein the transistor 36 is of the PNP variety, the position of the Zener diode 42 and potentiometer 43 are reversed so that the cathode of the Zener diode is connected to the junction point 44 and the anode thereof is connected through the potentiometer 43 to the junction joint 27.

A storage battery 47 which is to be charged is connected between the junction points 27 and 44. In this embodiment, the positive terminal thereof 48 is connected to the junction point 27 and the negative terminal 49 thereof is connected to the junction point 44.

OPERATION

Although the operation of the device embodying the invention has been indicated somewhat above, said operation will be described in detail hereinbelow for a better understanding of the invention.

The primary winding 12 of the power transformer 11 is preferably energized with an alternating potential which can be 110 volts or 220 volts. The alternating potential is rectified by the rectifier circuit 18 so that similar unidirectional pulses are applied to the junction point 22. The unidirectional pulses of current resulting therefrom are limited in magnitude by the current limiting resistor 23 as such current passes therethrough to junction point 24.

When the battery 47 is connected, the battery current will flow from junction point 27 to junction point 44 and through the Zener diode 42 and potentiometer 43. However, if the battery has less than a predetermined level of charge on it, the voltage differential developed between the center-tap 46 of the potentiometer 43 and the junction point 44 is less than that required to render the transistor 36 conductive. As a result, the unidirectional current pulses are applied through the resistor 28 to the junction point 31, through the diode 32 to the control electrode 33 of the SCR 26 to render said SCR conductive. Likewise, during this same condition, the capacitor 29 is allowed to charge to a higher value to keep the SCR 26 "turned on" or conductive. That is, when the capacitor 29 is charged, the control electrode potential of the SCR will remain higher than the cathode potential so that when the unidirectional pulses applied to the anode of the SCR 26 pass through a momentary condition of zero potential, the SCR is rendered conductive. Thus, the unidirectional current pulses are permitted to pass through the SCR 26 to the battery 47 thereby charging same.

As the battery becomes charged, the potential developed across the terminals thereof increases and the potential developed between the center-tap 46 and the potentiometer 43 and the junction point 44 also increases to a value which will render the transistor 36 conductive. When this condition exists, the junction point 31 is shorted out to the junction point 37 and causes the capacitor 29 to discharge through the transistor 36 to junction point 37.

When the transistor 36 is rendered conductive, it draws sufficient current through the resistor 28 to cause the "gate" control electrode voltage at junction point 31 to become low with respect to junction point 27 due to the discharge of the capacitor 29 through the collector-emitter path of the transistor 36. Hence, the SCR 26 is rendered non-conductive and the battery charging operation is automatically stopped.

The overall effect of this circuitry is to load the "gate" control electrode circuitry to the point where it can no longer operate the SCR 26. The diode 32 is a common rectifier used to prevent reverse current flow from the control electrode 33 which could destroy the SCR 26.

The battery charging circuit 10 is protected from short circuits occurring between the junction points 27 and 44 by the current-limiting resistor 23. The value of the current-limiting resistor 23 is variable depending upon the values of the SCR maximum ratings. Furthermore, the value of the resistor 23 can be selected as necessary to determine the normal maximum charging current of the overall battery charging circuit. Further, the value of the resistor can be made adjustable so that the operator can regulate the rate at which a battery is charged.

Although a particular preferred embodiment of the invention has been disclosed above for illustrative purposes, it will be understood that variations or modifications thereof which lie within the scope of the appended claim are fully contemplated.

The embodiments of the invention in which an exclusive property or privilege is claimed are defined as follows:

1. A charger for a storage battery, comprising:

a transformer having its primary winding connectible to a source of alternating potential and its secondary winding connectible through a rectifier to first and second charging terminals;

a current-limiting resistor one end of which is connected to said first charging terminal;

a silicon controlled rectifier series connected between said current-limiting resistor and said storage battery;

a series connected resistance and capacitance having a junction point therebetween connected in parallel with said silicon controlled rectifier, the control electrode of said silicon controlled rectifier being connected to said junction;

said storage battery series connectible between said silicon controlled rectifier and said second charging terminal;

voltage regulating means connected in parallel with said storage battery comprising a series connected Zener diode and potentiometer having a center-tap thereon;

a transistor having the collector-emitter path connected between said junction point and said second charging terminal, the base electrode of said transistor connected to said center-tap;

whereby when said transistor is rendered conductive by a predetermined potential across said potentiometer and applied to said base electrode of said transistor, said silicon controlled rectifier is rendered nonconductive.

References Cited

UNITED STATES PATENTS

| | | | |
|---|---|---|---|
| 3,009,091 | 11/1961 | Hallidy | 322—73 X |
| 3,114,095 | 12/1963 | Palmer | 320—39 |
| 3,159,755 | 12/1964 | Duncan | 320—4 X |
| 3,193,750 | 7/1965 | Chait | 320—22 |
| 3,310,724 | 3/1967 | Grafham | 320—39 |
| 3,310,729 | 3/1967 | Burgess et al. | 321—18 |
| 3,315,141 | 4/1967 | Wright et al. | 320—40 X |

LEE T. HIX, Primary Examiner

S. WEINBERG, Assistant Examiner

U.S. Cl. X.R.

323—22